Nov. 15, 1927.
O. ROSCHANEK
1,649,735
SHUTTING-OFF DEVICE AND VALVE
Filed May 22, 1923 2 Sheets-Sheet 1
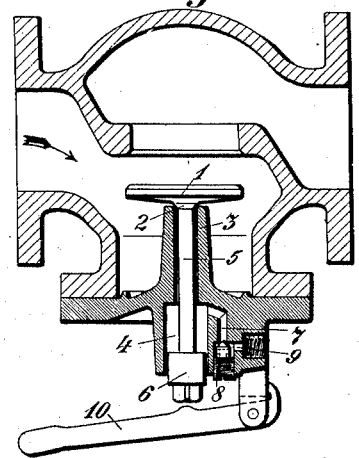
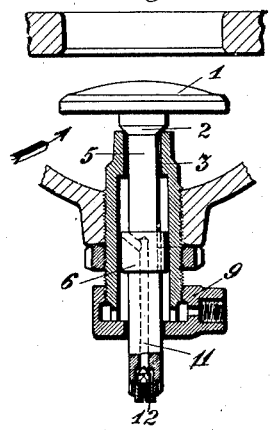
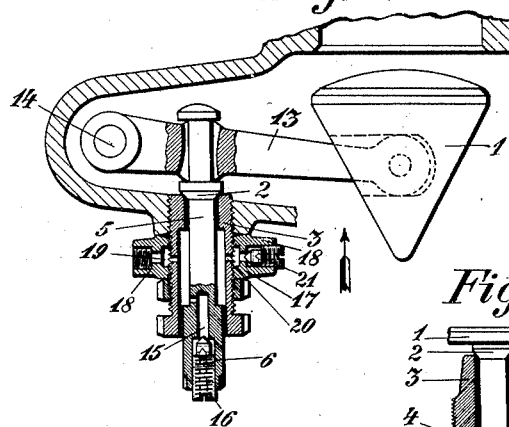
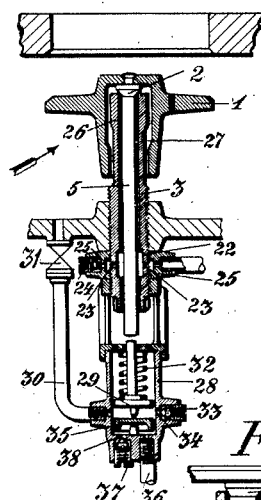
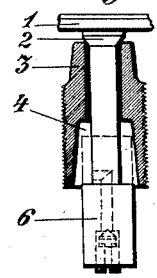
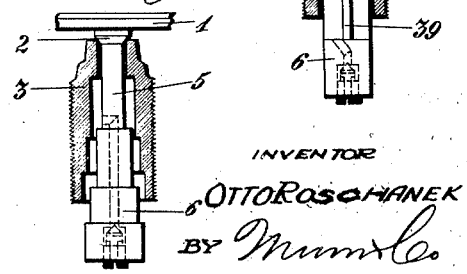
INVENTOR
OTTO ROSCHANEK
BY
ATTORNEY Nov. 15, 1927.  
O. ROSCHANEK  
1,649,735  
SHUTTING-OFF DEVICE AND VALVE  
Filed May 22, 1923  
2 Sheets-Sheet 2
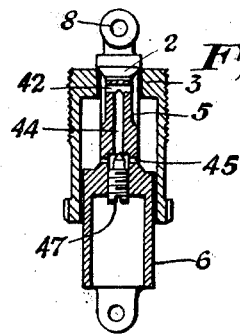
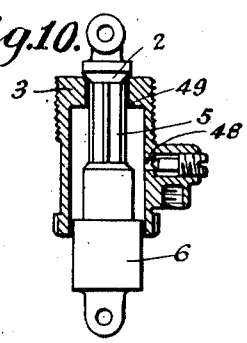
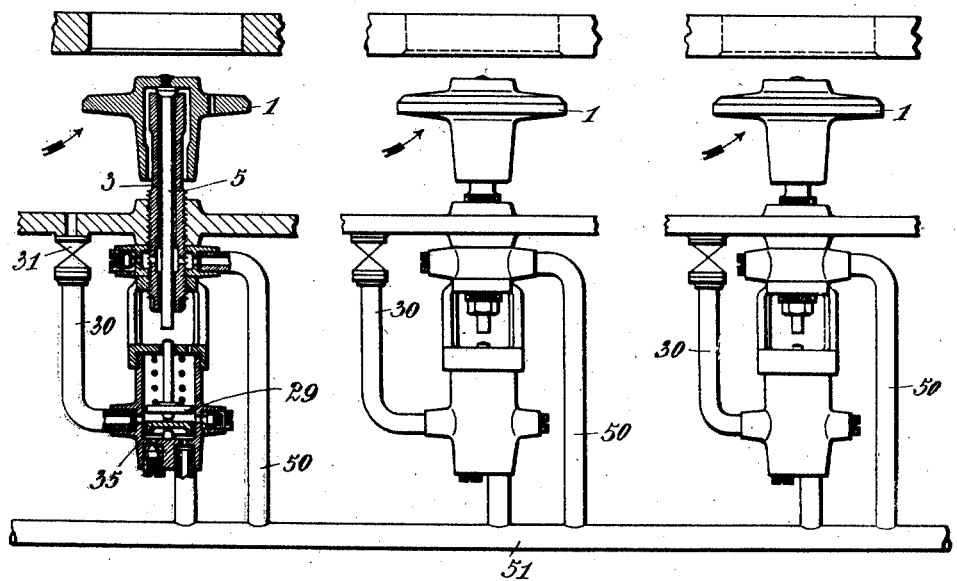
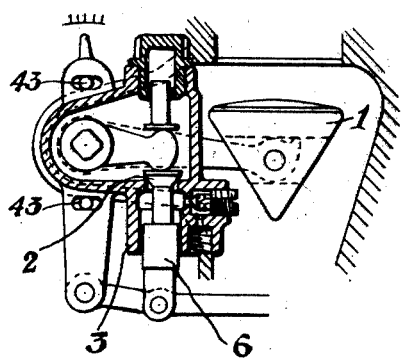
INVENTOR  
OTTO ROSCHANEK  
BY Munn & Co.  
ATTORNEYS Patented Nov. 15, 1927.

1,649,735

UNITED STATES PATENT OFFICE.

OTTO ROSCHANEK, OF VIENNA, AUSTRIA, ASSIGNOR OF ONE-HALF TO HUEBNER & MAYER, OF VIENNA, AUSTRIA.

SHUTTING-OFF DEVICE AND VALVE.

Application filed May 22, 1923, Serial No. 640,758, and in Austria May 31, 1922.

The known automatic shutting off devices, for closing valves and more particularly pipe break valves have the drawback that they do not come into operation absolutely reliably at the desired moment when they are not adjusted very nicely and carefully attended to. This drawback is due to the difficulty of adjustment and regulating, as also to the fact that the free movement of the movable parts of the valves may be interfered with by deposited foreign bodies, mud, scabs and the like. Further drawbacks consist in that the closing of such valves is too vehement and that frequently a hammering takes place which may even lead to the destruction of the valve.

All these drawbacks are obviated by the arrangement according to the invention, all the parts being more tightly guided, being located outside the interior of the valve and an automatic braking of the shutting off device in its closing movement, being provided for. At the same time all requirements of adjustment are satisfied in a simple manner so that a permanently reliable operation of the shutting off device is secured. A further part of the invention relates to an arrangement by which the fluid under pressure escaping from the automatically closing shutting off devices, when the same are actuated, is utilized for actuating any other devices. Further details of the invention will be described, reference being had to the accompanying drawings.

In the latter Figs. 1 to 11 are sectional views of various embodiments of the present invention and of details thereof.

In the embodiment of a pipe break valve shown in Fig. 1 on the automatically closing valve body 1 a small valve body 2 is provided, which, when the valve 1 is open, closes a guide box 3 on the cover of the casing. The guide box 3 extends at its bottom side into an open cylinder 4 projecting to the outside which serves to receive a piston 6 connected to the small valve body 2 by a rod 5. From the upper part of the cylinder 4 a passage 7 leads to the atmosphere, the free transverse section of which may be throttled at will by an adjusting screw 8. To this passage 7 a fluid pressure duct may be connected at 9 for leading the fluid under pressure escaping on actuating the valve to any desired place of consumption.

On the casing there is further pivoted a hand lever 10 for permitting the valve body 2 to be opened also by hand.

Whenever the speed of fluid under pressure in the piping exceeds a predetermined value, the valve 1 closes and the small valve body 2 is raised off its seat so that fluid under pressure enters the space 4 and there acts on the piston 6 which tends to counteract the closing movement of the valve 1.

The strength of such counteraction or braking can be adjusted by closing the adjusting screw 8 more or less completely, and thereby increasing or reducing the pressure in the space 4.

It will be seen that in this construction all the parts sliding in guides are located outside without the use of stuffing boxes and that the automatically closing valve can be ground in or otherwise operated upon or adjusted from the outside.

In the constructional form shown in Fig. 2 the guiding box 3 receiving the piston 6 is screwed into the casing so that the stroke of the valve body 1 may be adjusted at will. The piston 6 is provided with a bore 11 establishing communication between the cylinder space above the piston and the atmosphere. An adjusting screw 12 is mounted in the mouth of the bore 11 for throttling the escape of the fluid under pressure, part of which escapes from the space above the piston through the bore 11 into the atmosphere while the remainder passes between the piston and the cylinder wall to the other side of the piston from which it can be led to any place of consumption. By suitably adjusting screw 12 all of the fluids under pressure or a larger or smaller part thereof may be caused to escape through the branch 9.

A further constructional form of an automatically closing valve according to the invention is shown in Fig. 3. There the brake device is not arranged in alignment with the body 1 of the automatically closing valve but laterally thereof. The valve body 1 is pivotally connected with the rod carrying the small valve 2 and the piston 6 by a lever 13 pivoted at 14 to the casing. The fluid under pressure can escape for instance by a bore 15 in the piston 6, the mouth of which is closed by an adjusting screw 16, or a ring 17 may be screwed onto the guiding box, such ring carrying short tubes 18 communicating with the chamber 19 in the interior of the ring into which the fluid under pressure enters from the space above the piston through an opening 20 in the cylinder wall. The tubes 18 may be provided with adjusting screws 21 for governing the escape of the fluid under pressure into the atmosphere, or pipes may be connected to these tubes leading the fluid under pressure to any places of consumption of such fluid.

A constructional form similar to that shown in Fig. 3 is illustrated in Fig. 8 only in this case the adjustment of the stroke of the automatically closing valve is not effected by screwing the guide box 3 but by means of a link and lever gearing, comprising a lever pivoted on the outside of the casing, an arm rigidly connected to such lever and engaging the rod of the valve, and means for rocking said lever on its pivot such as a lever shown on the bottom of Figure 8. The rocking movement of the levers is limited by stop pins 43 fast on the casing and engaging slots of one of the levers.

In order to obtain a brake action on the automatically closing device increasing as its closing movement progresses the piston 6 and the guide box 3 may be constructed in a particular manner shown in Figs. 4, 5 and 6. In the construction shown in Fig. 4 the piston 6 works in a conical bore in the box 3 so that as the closing movement progresses, the space between the upper edge of the piston and the wall of the box decreases and therefore the free area for the escape of the fluid under pressure becomes progressively smaller so that the pressure above the piston increases. The same object is obtained in the construction shown in Fig. 5 by the use of a stepped piston and a correspondingly stepped cylinder the dimensions of the steps being so selected that the several steps of the piston enter at different times successively into the corresponding cylinder spaces.

In the constructional form shown in Fig. 6 the piston 6 is outside the cylinder 4 when the automatically closing device is in its open position and the piston carries on its lower part radial guide ribs 39 to guide the piston as it enters the cylinder. With this arrangement it is possible to commence the braking action at any desired moment in the course of the closing movement of the automatic shutting off device.

The brake piston may also be arranged as shown in Fig. 7. There the valve rod 5 sliding in the guide box 3 plays the part of the piston or acts as a piston element. The inner wall of the box 3 is enlarged at a point 22 outside the casing and from this annular space 22 the fluid under pressure escapes by radial bores 23 to the escape pipes 25 provided with governing screws 24 or to the connecting sockets for the pipes, leading to any places of consumption of the fluid under pressure.

In this constructional form the upper end of the box 3 screwed into the casing is provided with a head 26 resembling a piston and engaging into a cylindrical bore 27 in the body of the automatically shutting off device 1. This bore opening at the bottom in the body 1 is so stepped that the piston 26 is guided only in the bottom part of the bore while the upper part is of a larger diameter. In the closing movement of the valve 1 a less quantity of fluid under pressure will penetrate into the upper part of the bore 27 and into the guiding box from the moment when the piston 26 enters its guide in the bottom part of the bore 27, so that when the closing movement is continued a reduction of pressure takes place in the space above the piston guide which results in a brake action on the automatic shutting device.

The constructional form illustrated also shows an arrangement for bringing about the closing of the valve at will by means of the fluid under pressure flowing through the main pipe.

For this purpose below the piston element a co-axial cylinder 28 is provided in which works a spring actuated piston 29. Below the piston 29 in the cylinder 28 ends a fluid pressure pipe 30 containing a shutting off cock, valve or the like 31. When the cock, valve or the like 31 is opened, the incoming fluid under pressure raises the piston 29 overcoming the spring 32 and closes the valve 1. After closing the device 31 the spring 32 forces the piston 29 back into its initial position, the fluid under pressure escaping through an opening 34, capable of being throttled by means of an adjusting screw 33.

When there is a plurality of automatic shutting off devices in a plant as shown in Fig. 11, it may happen that in a given moment one or more of the devices fail to operate while the others close unobjectionably. Now, the invention also comprises an arrangement which insures the operation of all automatic shutting off devices if even only one of them operates as shown in Fig. 11. For this purpose below each automatic shutting off device a piston 5 rocking in a cylinder 3 is provided and the cylinder chambers or spaces below these pistons are connected by a suitable system of pipes 50, 51 with those parts of all automatic shutting off devices at which fluid under pressure escapes when the devices close automatically. When even only one of the automatic shutting off elements is operated fluid under pressure enters this system of pipes 50, 51 which at other times is free from pressure, so that the pistons are raised and any automatic shutting off devices tending to fail are positively operated. The details of the arrangement will now be described with reference to Fig. 7.

In the constructional form shown in Fig. 7 a second piston 35 arranged in the cylinder 28 below the piston 29 serves this purpose. Below the piston ends the pipe 36 forming part of the said system of pipes. Further in the cylinder 28 below the piston 35 an opening 38 leading to the atmosphere is provided which is capable of being throttled by the adjusting screw 37. The fluid under pressure entering on operating an automatic shutting device raises both pistons 29, 35 overcoming the operation of the spring 32 and positively closes the valve 1. The spring 32 forces back the pistons into their initial positions when the automatic shutting off devices are returned into the position ready for being used again, the fluid under pressure escaping through the opening 38.

Instead of permitting the fluid under pressure to escape from the space between the piston 6 and the guide box 3 into the atmosphere or into a separate pipe system, the arrangement may as shown in Fig. 9 be such that the fluid under pressure is forced back into the pipe for the same. For this purpose the rod 5 connecting the piston 6 with the vavle 2 is provided with a longitudinal bore 44 the lower end of which is provided with an adjusting screw 47 and leads into a transverse bore 45 communicating with the space above the piston 6 and the upper end of which bore 44 communicates through the transverse bore 42 with the space below the valve body 2. The lower part of the rod 5 is thick enough to be guided by the box 3. Therefore in the beginning of the closing movement the fluid under pressure communicates over an annular channel of comparatively large transverse area with the space above the piston. When the lower part of the rod enters the guiding box the fluid under pressure is enclosed in the space above the piston and can return to the main pipe for the fluid under pressure only by the narrow bore 44, therefore the resistance to the closing movement increases.

In the constructional form shown in Fig. 10 the piston closes after the first part of its movement closes the escape opening 48 for the fluid under pressure. The rod 5 is again stepped or shouldered and engages at the end of the stroke by its valve like shoulder with the seat 49 on the guiding box 3.

I claim:

1. In a combination with an automatic shutting off device adapted to be mounted in a duct for fluid under pressure, an additional valve exposed to the fluid under pressure in the duct and operatively connected with the said shutting off device and adapted to be opened whenever the said shutting off device moves towards its seat, a cylinder and a piston element working therein one of the two last named elements being stationary and the other being secured to the said additional valve, the end of the piston element remote from the said additional valve being exposed to atmospheric pressure, whereby a brake action is exerted on the automatic shutting off device and means for establishing a permanently open communication between the interior of the said cylinder and the atmosphere.

2. In combination with an automatic shutting off device adapted to be mounted in a duct for fluid under pressure, an additional valve exposed to the fluid under pressure in the duct and operatively connected with the said shutting off device and adapted to be opened whenever the said shutting off device moves towards its seat, a cylinder and a piston element working therein, one of the two last named elements being stationary and the other being secured to the said additional valve, the end of the piston element remote from the said additional valve being exposed to atmospheric pressure, whereby a brake action is exerted on the automatic shutting off device, the said cylinder being provided with an enlarged portion at its inner side surrounding the said piston element, a connection between the seat of the said additional valve and the said enlarged portion adapted to admit fluid under pressure from the duct to such enlarged portion and means for establishing a permanently open communication between the interior of the cylinder and atmosphere.

3. In combination with an automatic shutting off device adapted to be mounted in a duct for fluid under pressure, an additional valve exposed to the fluid under pressure in the duct and operatively connected with the said shutting off and adapted to be opened whenever the said shutting off device moves toward its seat, a stationary cylinder and a piston element working in such cylinder and secured to the said additional valve, the end of the piston element remote from the said additional valve being exposed to atmospheric pressure whereby a brake action is exerted on the automatic shutting off device, an additional cylinder secured to the automatic shutting off element and having a narrowed end portion, an additional stationary piston working in such additional cylinder and adapted to enter and substantially close the said narrowed end portion whenever the automatic shutting off element moves toward its seat and means for establshing a permanently open communication between the interior of the stationary cylinder and the atmosphere.

4. In combination with an automatic shutting off device adapted to be mounted in a duct for fluid under pressure an additional valve exposed to the fluid under pressure in the duct and operatively connected with the said shutting off device and adapted to be opened whenever the said shutting off device moves toward its seat, a stationary cylinder and a piston element working in such cylinder and secured to the said additional valve, the end of the piston element remote from the said additional valve being exposed to atmospheric pressure whereby a brake action is exerted on the automatic shutting off device, a cylinder co-axial with the said stationary cylinder and a spring actuated auxiliary piston working in the said co-axial cylinder and adapted to engage the said piston element, and means comprising a pipe connecting the duct for fluid under pressure and the part of the co-axial cylinder remote from the said piston element and a hand operated valve in such connecting pipe, and means for establishing a permanently open communication between the interior of the said stationary cylinder and the atmosphere.

5. In combination with a duct for fluid under pressure, a plurality of automatic shutting off devices mounted in such duct, an adidtional valve for each of such automatic shutting off elements exposed to the fluid under pressure in the duct and operatively connected with its associated automatic shutting off device and adapted to be opened when the said associated shutting off device moves towards its seat, a stationary cylinder and a piston element working in such cylinder for each of the automatic shutting off devices, such piston element being secured to the said additional valve, the end of the piston element remote from the said additional valve being exposed to atmospheric pressure, a chamber in the said cylinder, a connection between the seat of the said additional valve and the said chamber adapted to admit fluid under pressure from the duct to the said chamber, an additional pipe system, means for establishing communication between the said pipe system and the said chambers of all the automatic shutting off devices, means adapted to be operated by fluid under pressure of shutting each of the automatic shutting off elements, such means being permanently connected to such pipe system, and means for establishing a permanently open communication between the interior of the said stationary cylinder and the atmosphere.

6. In combination with a duct a fluid under pressure, a plurality of automatic shutting off devices mounted in such duct, an aditional valve for each of such automatic shutting off elements exposed to the fluid under pressure in the duct and operatively connected with its associated automatic shutting off device and adapted to be opened whenever the said associated shutting off device moves towards its seat, a stationary cylinder and a piston element working in such cylinder for each of the automatic shutting off devices, such piston element being secured to the said additional valve the end of the piston element remote from the said additional valve being exposed to atmospheric pressure, a chamber in the said cylinder, a connection between the seat of the said additional valve and the said chamber adapted to admit fluid under pressure from the duct to the said chamber, an additional pipe system, means for establishing communication between the said pipe system and the said chambers of all the automatic shutting off devices, a supplemental cylinder and spring actuated piston for each of the automatic shutting off devices, such supplemental spring actuated piston being adapted to shut its associated shutting off element the supplemental cylinder of all the automatic shutting off devices permanently communicating with the said pipe system and means for establishing a permanently open communication between the interior of the said stationary cylinder and the atmosphere.

In testimony whereof I have set my signature.

OTTO ROSCHANEK.